United States Patent
Horning

(10) Patent No.: US 8,413,917 B2
(45) Date of Patent: Apr. 9, 2013

(54) ROLLER MILL WITH GAS DUCT

(75) Inventor: Bent Horning, Hornbak (DK)

(73) Assignee: FLSmidth A/S, Valby (DK)

( * ) Notice: Subject to any disclaimer, the term of this patent is extended or adjusted under 35 U.S.C. 154(b) by 0 days.

(21) Appl. No.: 13/056,357

(22) PCT Filed: Jun. 1, 2009

(86) PCT No.: PCT/EP2009/056695
§ 371 (c)(1),
(2), (4) Date: Jan. 28, 2011

(87) PCT Pub. No.: WO2010/012528
PCT Pub. Date: Feb. 4, 2010

(65) Prior Publication Data
US 2011/0127360 A1    Jun. 2, 2011

(30) Foreign Application Priority Data

Jul. 30, 2008  (DK) .................................. 2008 01049

(51) Int. Cl.
*B02C 19/00* (2006.01)
*B02C 21/00* (2006.01)

(52) U.S. Cl. .............................. 241/57; 241/58; 241/119

(58) Field of Classification Search .......... 241/117–121, 241/57, 58
See application file for complete search history.

(56) References Cited

U.S. PATENT DOCUMENTS

| | | | | |
|---|---|---|---|---|
| 4,721,258 A | * | 1/1988 | Dougan et al. | 241/57 |
| 4,874,135 A | * | 10/1989 | Provost | 241/57 |
| 5,054,697 A | * | 10/1991 | Provost | 241/61 |
| 5,386,619 A | * | 2/1995 | Wark | 29/401.1 |
| 5,908,167 A | * | 6/1999 | Provost | 241/119 |
| 5,971,302 A | * | 10/1999 | Doumet | 241/17 |
| 8,113,452 B2 | * | 2/2012 | Folsberg et al. | 241/57 |

FOREIGN PATENT DOCUMENTS

| | | |
|---|---|---|
| DE | 3409710 A1 | 9/1984 |
| EP | 0842702 A | 5/1998 |
| JP | 2002370044 A | 12/2002 |

OTHER PUBLICATIONS

Written Opinion of the International Searching Authority of Application PCT/EP2009/056695.
International Search Report for PCT/EP2009/056695 dated Sep. 16, 2009.
International Preliminary Report on Patentability for PCT/EP2009/056695 dated Oct. 25, 2010.

* cited by examiner

*Primary Examiner* — Faye Francis
(74) *Attorney, Agent, or Firm* — Buchanan Ingersoll & Rooney PC

(57) ABSTRACT

A roller mill for grinding particulate material such as cement raw materials, cement clinker and similar materials comprises a mill housing surrounding a substantially horizontal grinding table, a number of rollers each rotating about a roller shaft and configured for interactive operation with the grinding table and at least one mechanism or device for introducing gases into the mill housing. The at least one mechanism or device for introducing gases into the mill housing comprises an annular duct having openings in a wall facing the grinding table and being located around the outer circumference of the grinding table. As a consequence hereof, a significant reduction of the pressure loss in a roller mill and thus a significant reduction of energy consumption will be ensured.

18 Claims, 2 Drawing Sheets

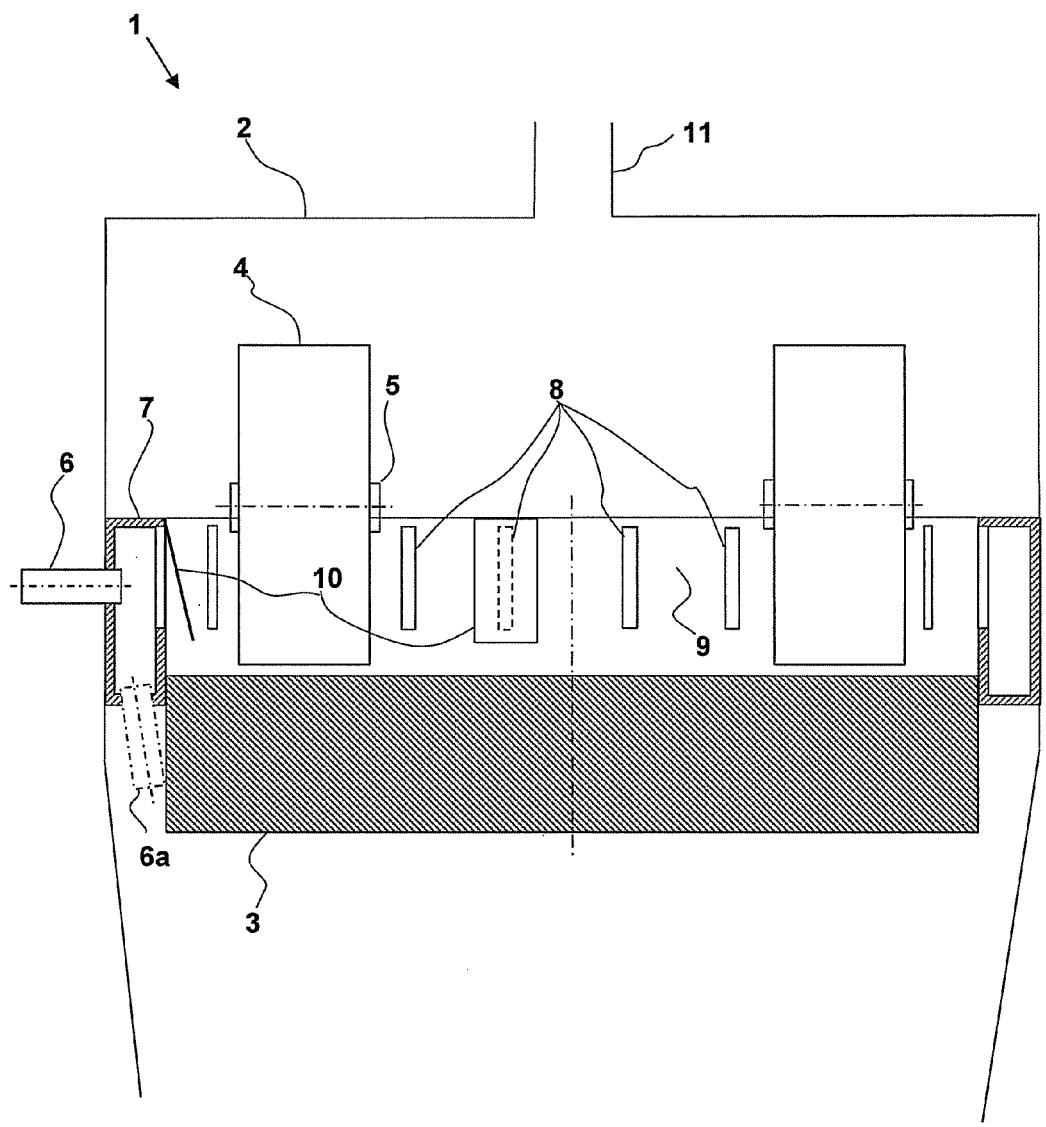

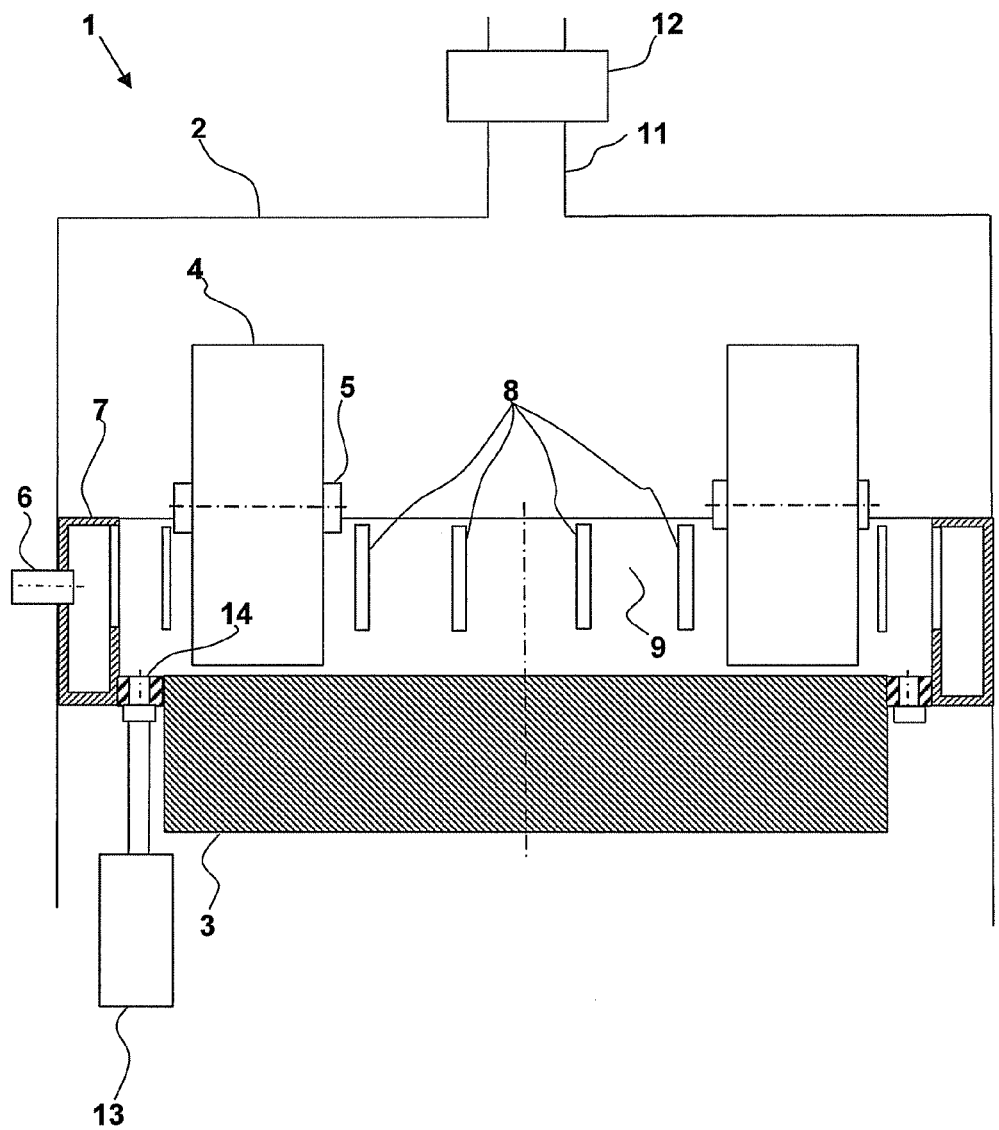

ROLLER MILL WITH GAS DUCT

CROSS REFERENCE TO RELATED APPLICATIONS

The present patent application is the United States national phase under 35 U.S.C. §371 of International Application No. PCT/EP2009/056695, filed on Jun. 1, 2009, and claiming priority to Danish Patent Application No. PA 2008 01049, filed on Jul. 30, 2008. The entirety of both of these applications are incorporated by reference herein.

FIELD OF INVENTION

The present invention relates to a roller mill for grinding particulate material such as cement raw materials, cement clinker and similar materials, said roller mill comprises a mill housing surrounding a substantially horizontal grinding table, a number of rollers, each rotating about a roller shaft, configured for interactive operation with the grinding table and means for introducing gases into the mill housing. The invention also relates to a method for carrying out the invention.

BACKGROUND OF THE INVENTION

A roller mill of the aforementioned kind is well-known from the patent literature. The Japanese patent application no. 2002370044 A2 discloses a vertical roller mill for grinding particulate material comprising a mill housing surrounding a rotatable grinding table and rollers which are configured for interactive operation with the grinding table. The roller mill has a main gas supply duct connected to the mill housing beneath the grinding table for introducing gases into the mill housing through a nozzle ring enclosing the grinding table. It is necessary to keep a high velocity over the nozzle ring to avoid material from falling by gravity through the nozzle ring down to a duct below the grinding table. The high circulation factor of the material over the nozzle ring, and the high gas velocity through the nozzle ring creates a high pressure loss across the nozzle ring, and thereby a high fan energy consumption as compared to the mill motor power consumption. In addition to the high energy consumption, the high gas velocity also causes substantial wear of the parts in the roller mill swept over by the gas. In the Japanese patent application a bypass duct which receives gases from the main supply gas duct is connected to the mill housing at a single location at a point above the grinding table. The gas flow from the bypass duct is increased when more gas is needed in the mill housing depending on the load in the mill. Both the gas flow through the bypass duct and the main supply duct are activated by means of the same fan and the flow in the bypass duct is regulated by a throttle valve. Thus it will not be possible to reduce the pressure loss since the pressure in the mill housing must be kept sufficiently low to maintain the velocity in the nozzle ring, and as a consequence hereof the amount of gas introduced through the bypass duct must be controlled by means of the mentioned throttle valve creating the same pressure loss as across the nozzle ring. Furthermore the bypass duct cannot singly make up for the introduction of the complete amount of needed gases in the roller mill since it only introduces gases at a single location in the mill housing. The main gas supply must be introduced at several locations around the grinding table in order to obtain a properly gas/material suspension.

SUMMARY OF THE INVENTION

It is the objective of the present invention to provide a roller mill by means of which the described disadvantages are significantly reduced.

This is obtained by a roller mill of the kind mentioned in the introduction, and characterized in that at least one device, mechanism or apparatus for introducing at least one gas into the mill housing comprises an annular duct having openings in a wall facing the grinding table and being located around the outer circumference of the grinding table.

This will ensure a significant reduction of the pressure loss in a roller mill and thus a significant reduction of the energy consumption of a roller mill. One or more gases may be introduced via a gas inlet connected to the annular duct. In this way the one or more gases introduced via the gas inlet to the annular duct are directed to the grinding table through the openings in the annular duct. The reduction of the pressure loss is achieved as the gas velocity through the openings of the annular duct just has to be sufficient to prevent the particles to flow radially into the openings of the annular duct and sufficient to ensure that the ground material is suspended in the gases. Hence the gas velocity can be kept low resulting in a low pressure loss.

It is preferred that the openings in the annular duct, out of which the one or more gases flow, are located above the surface of the grinding table so that all the gases are introduced radially in the direction of and onto the grinding table. The gas inlet can be connected to the side of the annular duct which is facing (or can be a part of) the mill housing or be connected to the bottom of the annular duct, so that gases to the annular duct could be introduced between the mill housing and the grinding table. Other locations for connecting the gas inlet are also conceivable and it will also be possible to have multiple gas inlets for the annular duct.

It is preferred that the annular duct encloses the entire grinding table and that the wall of the duct, which is facing the grinding table, is substantially vertical. A mechanism, apparatus or device, such as inclined plates for protecting the openings of the annular ducts against possible incoming particles, for example, could be mounted on the annular duct. The cross section of the annular duct could be rectangular or square-shaped but also other forms of cross sections for the annular duct are conceivable as long as it is ensured that gases are introduced in appropriate manner.

In a further embodiment a mechanism, apparatus or device for introducing gases into the mill housing comprises a nozzle ring, through which one or more gases are directed, surrounding the grinding table and placed between the annular duct and the grinding table. In this way it is possible to introduce gases around the grinding table both vertically through the nozzle ring and horizontally through the annular duct whereby an advantageous gas flow in the mill housing can be achieved, making it possible to affect the particle size distribution curve.

In a further embodiment a mechanism, apparatus or device for introducing gases into the mill housing comprises two or more separate feed systems each comprising means such as a fan for introducing gases into the mill housing. The gases can either be blown or sucked through the feed systems. One feed system could introduce gases in a substantially vertical direction through a nozzle ring surrounding the grinding table and a second feed system could introduce gases substantially radially in the direction of and onto the grinding table through the openings in the annular duct. It is preferred that less than 50% of the gases are introduced through the nozzle ring and that the rest of the gases are introduced through the openings of the annular duct, but other distributions of the flow are also possible as long as the objective of lowering the fan energy consumption is achieved. Thus the major quantity of the introduced gases to the mill housing, coming from the openings of the annular duct, could be introduced at a low velocity resulting in a low pressure drop. Furthermore it is possible to introduce cold gases, i.e. the atmospheric air surrounding the roller mill, through one system and hot gases through the second system. The volume of cold gases is smaller than the volume of hot gases which means that the load on the fan subjected to cold gases would be relatively smaller. Furthermore, it is advantageous when some of the gases being introduced into the mill housing are made up of cold gases such as atmospheric air or recirculation gas from the mill system since this would lessen the requirements imposed upon the materials and components of the feed system as compared to a feed system for introducing hot gases. The relationship between the quantity of hot gases and colder gases, respectively, must be optimized relative to the process in the mill in order to minimize the energy consumption for the grinding process and the air flow process.

In a special embodiment the annular duct comprises a number of separate duct sectors around its circumference, where each duct sector has a gas inlet. In this way it is possible to control the introduction of gases around the grinding table thereby increasing the options for optimizing the gas flow.

In one embodiment it is preferred that the grinding table is rotatable and that the rollers are only rotatable about their roller shafts.

In another embodiment it is preferred that the rollers are connected to a centrally positioned, compared to the grinding table, rotatable vertical shaft where the grinding table could either be stationary or rotatable.

Other details, objects, and advantages of the invention will become apparent as the following description of certain present preferred embodiments thereof and certain present preferred methods of practicing the same proceeds.

BRIEF DESCRIPTION OF THE DRAWINGS

The invention will now be described in further details with reference to the drawing, being diagrammatical, and where FIG. 1 shows a sectional view of a roller mill according to the invention, FIG. 2 shows a sectional view of a further embodiment of a roller mill according to the invention.

DETAILED DESCRIPTION OF PRESENT PREFERRED EMBODIMENTS

FIG. 1 shows a sectional view of a roller mill 1 with a mill housing 2 surrounding a substantially horizontal grinding table 3. A number of rollers 4, each rotating about a roller shaft 5, are configured for interactive operation with the grinding table 3. Raw material is continuously directed to the grinding table 3 through a feed inlet (not shown). Gases are introduced via a gas inlet 6 connected to an annular duct 7 which is situated around the outer circumference of the grinding table 3. The annular duct has openings 8 in a wall 9 facing the grinding table 3. In this way the gases introduced via the gas inlet 6 to the annular duct 7 are directed to the grinding table 3 through the openings 8 in the annular duct 7. The ground material suspended in gases is extracted through an outlet 11 in the upper part of the mill housing 2 by means of a fan (not shown). The openings 8 in the annular duct 7 are placed above the upper surface of the grinding table 3 and the annular duct 7 is enclosing the entire grinding table 3 and the wall 9 of the annular duct 7, which is facing the grinding table 3, is substantially vertical. The gas inlet 6 can, instead of being connected to the side of the annular duct 7, be connected to the bottom of the annular duct 7, allowing the gases to be introduced between the mill housing 2 and the grinding table 3 (this gas inlet 6a is shown with dotted lines). Inclined plates 10 are mounted on the annular duct 7 to protect the openings 8 against possible incoming particles (only two inclined plates 10 are shown in the figure).

FIG. 2 shows a sectional view of a roller mill 1 with two separate feed systems each comprising a fan 12, 13 for introducing gases into the mill housing 2. The feed system comprising the fan 12 sucks gases substantially radially in the direction of and onto the grinding table 3 through the openings 8 in the annular duct 7 and the second feed system comprising the fan 13 blows gases in a substantially vertical direction through a nozzle ring 14 surrounding the grinding table 3. It is preferred that less than 50% of the gases are introduced through the nozzle ring 14 and that the rest of the gases are introduced through the openings 8 of the annular duct 7, but alternative distribution of the flow is possible as long as the objective of lowering the pressure loss is achieved.

While certain present preferred embodiments of the roller mill and certain embodiments of methods of practicing the same have been shown and described, it is to be distinctly understood that the invention is not limited thereto but may be otherwise variously embodied and practiced within the scope of the following claims.

The invention claimed is:

1. A roller mill comprising:
    a mill housing surrounding a substantially horizontal grinding table;
    a plurality of rollers, each of the rollers rotating about a roller shaft that interactively operates with the grinding table;
    at least one device for introducing at least one gas into the mill housing comprising two or more separate feed systems, each of the feed systems comprising a mechanism for moving the at least one gas; and
    an annular duct having openings in a vertical wall facing the grinding table, the annular duct being located around an outer circumference of the grinding table.

2. A roller mill comprising:
    a mill housing surrounding a substantially horizontal grinding table;
    a plurality of rollers, each of the rollers rotating about a roller shaft that interactively operates with the grinding table;
    at least one device for introducing at least one gas into the mill housing comprising two or more separate feed systems, each of the feed systems comprising a mechanism for moving the at least one gas; and
    an annular duct having openings in a wall facing the grinding table, the annular duct being located around an outer circumference of the grinding table; and
    wherein the feed systems comprise a first feed system and a second feed system, the mechanism for moving the at least one gas of the first feed system comprising a fan and the mechanism for moving the at least one gas of the second feed system comprising a fan;
    the fan of the first feed system moving the at least one gas through the openings of the annular duct;
    the fan of the second feed system moving the at least one gas into the mill housing via a nozzle ring, the nozzle ring being positioned between the grinding table and the annular duct.

3. The roller mill of claim 2 wherein the openings of the annular duct are placed above an upper surface of the grinding table.

4. The roller mill of claim 2 wherein the annular duct encloses the entire grinding table and wherein the wall facing the grinding table is substantially vertical.

5. The roller mill of claim 2 further comprising at least one inclined plate mounted adjacent to the annular duct to protect the openings of the annular duct from incoming particles.

6. The roller mill of claim 2 wherein the nozzle ring surrounds the grinding table.

7. The roller mill of claim 6 wherein the nozzle ring is between the annular duct and the grinding table.

8. The roller mill of claim 2 wherein the annular duct comprises a plurality of duct sectors around a circumference of the annular duct, each of the duct sectors having a gas inlet.

9. The roller mill of claim 2 wherein the grinding table is rotatable and each of the rollers is only rotatable about the roller shaft to which that roller is connected.

10. The roller mill of claim 2 wherein the rollers are connected to a rotatable vertical shaft that is centrally positioned relative to the grinding able and wherein the grinding table is stationary or rotatable.

11. A method for grinding particulate material comprising:
grinding material in a roller mill via a number of rollers configured for interactive operation with a grinding table surrounded by a mill housing of the roller mill; and
introducing at least one gas into the mill housing via a plurality of separate feed systems, each feed system comprising at least one fan to move the at least one gas into the mill housing of the roller mill; and
wherein a first feed system of the feed systems introduces at least one gas in a substantially vertical direction through a nozzle ring surrounding the grinding table and wherein a second feed system of the feed systems introduces at least one gas substantially radially in a direction of and onto the grinding table through openings in an annular duct that encloses the grinding table, the openings in the annular duct being located in a wall facing the grinding table.

12. The method of claim 11 wherein less than 50% of the at least one gas is introduced through the nozzle ring and a remaining portion of the at least one gas is introduced through the openings of the annular duct.

13. A roller mill comprising:
a mill housing surrounding a grinding table;
a plurality of rollers, each of the rollers rotating about at least one roller shaft adjacent the grinding table;
an annular duct having openings in a vertical wall facing the grinding table and being located around an outer perimeter of the grinding table;
a plurality of feed systems for introducing at least one gas into the mill housing, at least one of the feed systems comprising a fan moving at least one gas out of the annular duct.

14. A roller mill comprising:
a mill housing surrounding a grinding table, the grinding table being stationary or rotatable;
a plurality of rollers, each of the rollers rotating about at least one roller shaft adjacent-the grinding table;
an annular duct having openings in a wall facing the grinding table and being located around an outer perimeter of the grinding table;
a plurality of feed systems for introducing at least one gas into the mill housing, at least one of the feed systems comprising a fan moving at least one gas out of the annular duct; and
wherein the feed systems comprise a first feed system and a second feed system, the first feed system comprising the fan moving at least one gas out of the annular duct, the second feed system comprising a nozzle ring surrounding the grinding table, the nozzle ring being between the annular duct and the grinding table.

15. The roller mill of claim 14 wherein the second feed system is also comprised of a fan, the fan of the second feed system positioned such that the fan of the second feed system moves at least one gas through the nozzle ring and into the mill housing.

16. The roller mill of claim 15 further comprising a plurality of plates attached to the annular duct to protect the openings of the annular duct from incoming particles and wherein the at least one gas introduced into the mill housing via the second feed system is cooler and of a different composition than the at least one gas introduced into the mill housing via the first feed system.

17. The roller mill of claim 14 wherein the openings of the annular duct are positioned above an upper surface of the grinding table.

18. The roller mill of claim 17 wherein the wall facing the grinding table is substantially vertical.

* * * * *